United States Patent [19]

Ikeda

[11] Patent Number: 5,568,285
[45] Date of Patent: Oct. 22, 1996

[54] IMAGE PROCESSING SYSTEM INCLUDING PLURAL COLOR PROCESSING SECTIONS

[75] Inventor: Yoshinori Ikeda, Kawasaki, Japan

[73] Assignee: Canon Kabushiki Kaisha, Tokyo, Japan

[21] Appl. No.: 411,403

[22] Filed: Mar. 28, 1995

Related U.S. Application Data

[63] Continuation of Ser. No. 873,030, Apr. 24, 1992, abandoned.

[30]    Foreign Application Priority Data

Apr. 26, 1991 [JP] Japan ................. 3-097241
Apr. 27, 1992 [JP] Japan ................. 4-107676

[51] Int. Cl.[6] ................. H04N 1/54; H04N 1/56; H04N 1/60
[52] U.S. Cl. ............. 358/518; 358/520; 358/501
[58] Field of Search ................. 358/518, 519, 358/520, 523, 530, 501, 502

[56] References Cited

U.S. PATENT DOCUMENTS 5,057,914  10/1991  Tsuji et al. ................. 358/530

OTHER PUBLICATIONS

The Measurement of Appearance, Richard S. Hunter & Richard W. Harold, (1987), pp. 143–144.

*Primary Examiner*—Scott A. Rogers
*Attorney, Agent, or Firm*—Fitzpatrick, Cella, Harper & Scinto

[57]            ABSTRACT

A color image processing system processes image data by a plurality of processing sections 105-1, 105-2, 109-1 to 109-4, and 110 for sequentially processing given image data. The system includes an input circuit 127, 327 through which color image data is input to a selected one of the plurality of processing sections.

24 Claims, 8 Drawing Sheets

IMAGE PROCESSING SYSTEM INCLUDING PLURAL COLOR PROCESSING SECTIONS

This application is a continuation of application Ser. No. 07/873,030 filed Apr. 24, 1992, now abandoned.

BACKGROUND OF THE INVENTION

1. Field of the Invention

The present invention relates to an image processing system having an interface function for data transfer with external equipment.

2. Related Background Art

In recent years, color copying machines have progressed remarkably in their development and availability. In addition, such color copying machines have come to incorporate various types of printer engines, such as an ink-jet type, a thermal ink-transfer type, a silver-salt photography type and an electrophotography type. Among these, the use of the electrophotography type, with its advantageous capabilities of achieving high speed and high image quality, has spread remarkably. An example of a conventional color copying machine is shown in FIG. 1.

In this color copying machine, a color original is subjected to color separation with respect to each pixel thereof, and is read in a digital manner in the form of an electrical signal. Then, in a color laser beam printer section employing an electrophotographic process, a full-color print image is obtained. The machine is roughly divided into two sections, namely, an image reading section A and an image printing section B.

In the image reading section A, an original exposure lamp 2 illuminates a color original 1. Light reflected from, and thus indicative of, the color original 1 is focused onto a color image sensor 3, forming an image thereon. The color image sensor 3 performs a color separation with respect to each pixel, and produces a color-separate color image signal. The color image signal is processed by a color signal processing circuit 4, transmitted through a cable 25, and input to an image processing circuit 5. The image processing circuit 5 digitizes the input signal, subjects the digitized color signal to digital image processing, performs color correction, and then supplies a digital image signal to the image printing section B.

When image data is sent to the image printing section B via a cable 6, a semiconductor laser drive section 7 modulates a semiconductor laser 8 on the basis of the image data. Then, a color-separate one-color latent image is formed in a raster pattern on a photosensitive drum (latent image formation). The latent image thus formed is visualized by a developing device 21 (development), thereby forming a color-separate toner image on the photosensitive drum. A sheet of copying paper is fed from a cassette 17 or a cassette 18, and wound on a transfer drum 12, on which synchronized motion of the paper and the color-separate toner image causes the toner image to be transferred to the copying paper (transfer).

As will be clearly understood from FIG. 1, an image corresponding to only one color is formed by executing the image forming process one time. Therefore, the process of subjecting the original to color separation has to be executed the same number of times as the number of the toner colors, that is, four times in correspondence with yellow (Y), magenta (M), cyan (C) and black (K). Similarly, in synchronism with the color separation for each color, the process comprising latent image formation, development and transfer has to be executed in correspondence with each of the color components. Thus, when the copying paper wound on the transfer drum 12 has rotated four times until the completion of four transfer operations for four colors, the paper is separated from the drum 12 by a separation pawl 13. Then, the copying paper is guided to heat-pressure fixing rollers 15 and 16, by which the toner image on the copying paper is fixed. Thereafter, the paper is discharged to the outside of the copying machine, thereby completing the production of a full-color copy. In this way, with such a color copying machine, the image forming process must be performed a plurality of times in order to prepare a plurality of color-separate images Y, M, C and K of the stated colors. This feature of the machine renders it unsuitable for achieving a speed higher than the currently available level.

In view of the above-described point, a certain type of apparatus has been proposed. Such an apparatus includes a memory for storing color image signals, and four drums for Y, M, C and K. Image forming operations for Y, M, C and K are performed in a mutually overlapping relationship in time, thereby achieving a higher speed.

On the other hand, an apparatus of the same type as that shown in FIG. 1 can be adapted, utilizing the characteristic of digitally handling images possessed by this type of apparatus, to input image data via an interface circuit from external equipment, thereby enabling various processings. Proposals for such apparatuses have been made, for example, in U.S. Ser. No. 691,968, filed Apr. 26, 1991.

However, it has not been possible to realize an efficient and simple structure for providing an interface of the above-described kind for an apparatus, such as above, having an image memory as well as a plurality of drums.

It is a great problem to determine how to construct the interface when it is to be provided in the type of apparatus having a color image memory, in particular, a memory for storing compressed color image data (such an apparatus may not necessarily have a plurality of drums).

Another problem arises from the variety of forms in which a set of data expresses a color image. The data may be in the form of a set comprising red (R), green (G) and blue (B), or M, C, Y and K. Still alternatively, the data may be formulated according to the (L, a*, b*) system or the (X, Y, Z) system. Thus, the form of the data varies depending on the type of the equipment used. However, in a conventional color copying apparatus having an interface function, since the output section (printer) is capable of receiving only data in the form of M, C, Y and K, the equipment (such as a host computer, not shown) which is to supply the output section with color image data may have to operate on a large amount of color image data to effect conversion such as (R, G, B)→(C, M, Y, K). Such conversion requires a relatively long period of time. For example, when 96M byte image data is converted for a full-color A3 image, a period of several tens of seconds to several minutes is necessary.

SUMMARY OF THE INVENTION

An object of the present invention is to provide a color image processing system having an interface that is capable of overcoming the above-described problems.

Another object of the present invention is to provide a color image processing system capable of processing a plurality of different types of data.

In order to achieve the above objects, according to a preferred embodiment of the present invention, there is provided a color image processing system in which image data is processed by a plurality of processing sections for sequentially processing given image data. The system is characterized in that it comprises an input means through which color image data is input to one of the plurality of processing sections selected from among them.

A further object of the present invention is to provide a color image processing system capable of inputting compressed image data.

The above and other objects and the features of the present invention will be apparent from the following description of embodiments with reference to the accompanying drawings.

DETAILED DESCRIPTION OF THE PREFERRED EMBODIMENTS

Embodiments of the present invention will now be described with reference to the drawings.

First, a description will be given of an example of the construction of an apparatus to which the present invention is applied.

Figure 1:
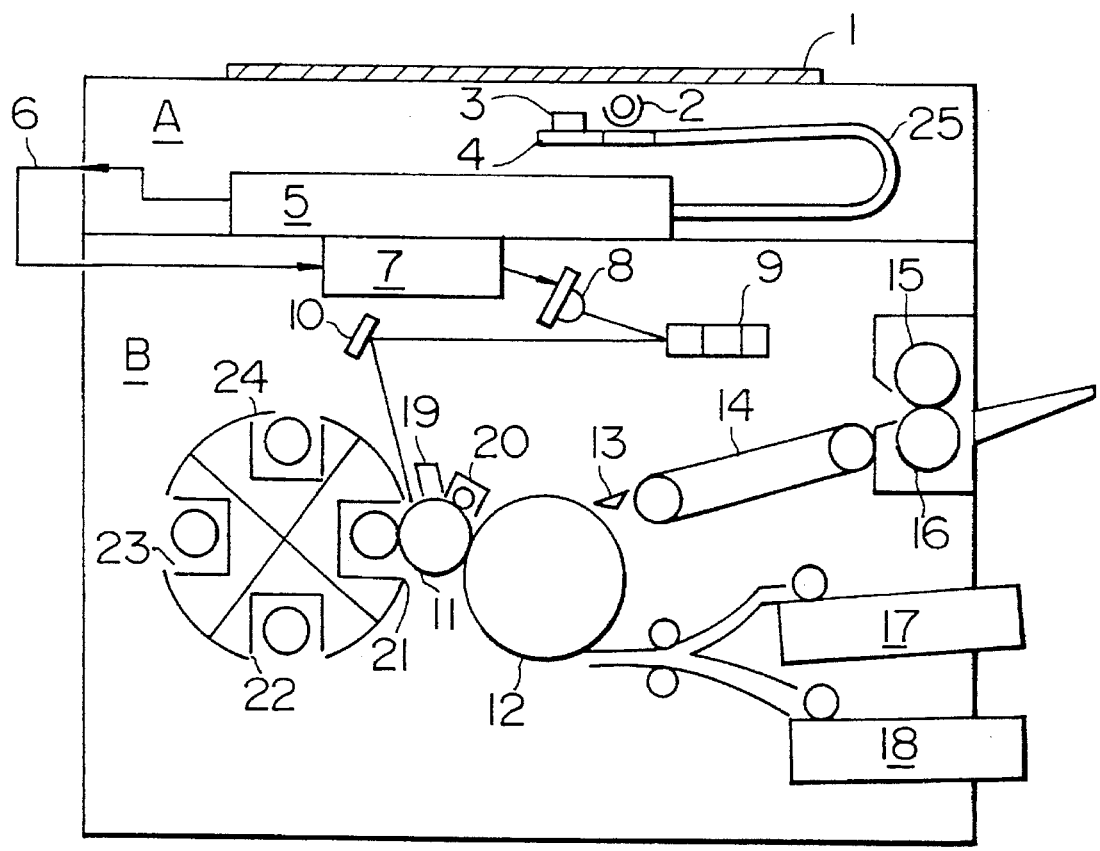
FIG. 1 schematically shows an example of the construction of a conventional color copying machine.
Figure 2:
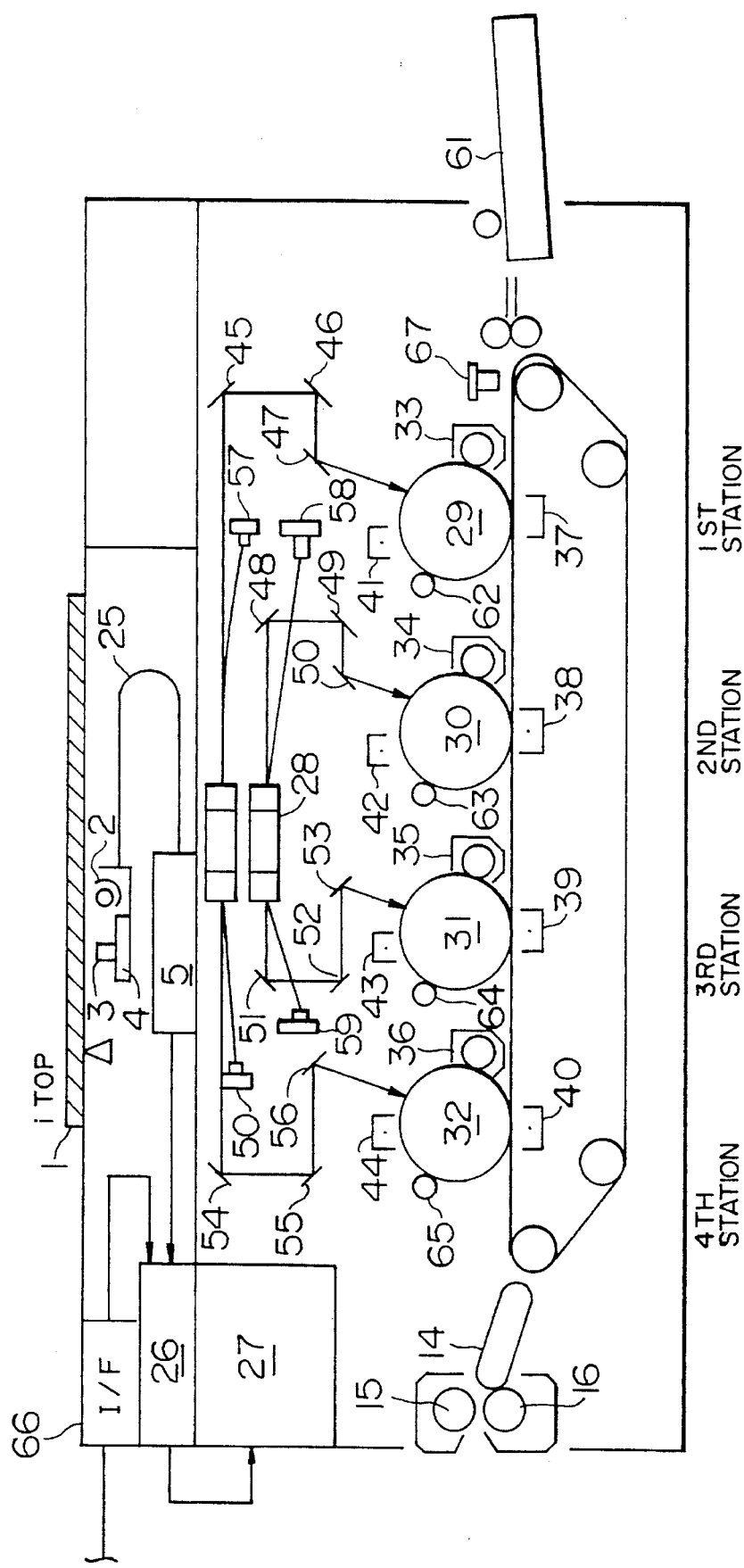
FIG. 2 schematically shows the construction of a color copying machine to which a first embodiment of the present invention is applied.

FIG. 2 is a sectional view for illustrating the construction of the apparatus. (In FIG. 2, identical reference numerals are used to denote elements and functions which are the same as those shown in FIG. 1). An illumination lamp 2 illuminates an original placed on an original table 1. A charge-coupled device (CCD) color sensor 3 reads a color-separated image. An output of the sensor 3 is supplied, through a color signal processing circuit 4 and a cable 25, to an image processing circuit 5 serving as a first digital image processing section, in which the sensor output is subjected to digital image processing. The above part of the construction is the same as that shown in FIG. 1.

The construction of the apparatus being described is distinguished in that, after the digital image processing, a full-color image signal corresponding to one page of the original is temporarily stored in a memory device 26. This is for the following reason: since the apparatus has, as will be described below, a plurality of image forming units (including a plurality of photosensitive drums) juxtaposed with each other, in order that image forming operations for a plurality of colors can take place within the same period of time, it is necessary to store image data for at least the period of time required to cover the distance between two adjacent image forming units. The image forming units are independently provided in correspondence with four color components, that is, M, C, Y and K. Each of the image forming units has one of photosensitive drums 29 to 32, one of primary chargers 41 to 44, one of developing devices 33 to 36, one of transfer chargers 37 to 40, and one of cleaners 62 to 65. A paper end detector 67 detects the forward end of a sheet of paper fed from a cassette 61 and advancing forward, and generates a paper end signal. A timing control circuit (not shown) operates in such a manner that image signals for the color components, already stored in the memory 26, are read at an appropriate timing in synchronism with the paper end signal. The read signals are processed by a second digital image processing section 27. Thereafter, a magenta (first color) image is formed on the copying paper in a first (1st) station. Specifically, a light beam from a semiconductor laser 57 is modulated on the basis of the corresponding image signal, reflected by a polygon mirror 28 and reflecting mirrors 45, 46 and 47, and radiated onto the photosensitive drum 29. After a latent image is formed on the drum 29, the developing device 33 develops the latent image with a magenta toner. Thereafter, the operation of the transfer charger 37 causes a magenta (first color) image to be formed on the copying paper. Subsequently, similar image forming operations are sequentially performed in each of second (2nd), third (3rd) and fourth (4th) stations, in which latent images are precisely developed with cyan, yellow and black toners, respectively, and developed images are transferred to the copying paper. Thereafter, fixing rollers 15 and 16 fix the transferred images, thereby completing a single copy.

Figure 3:
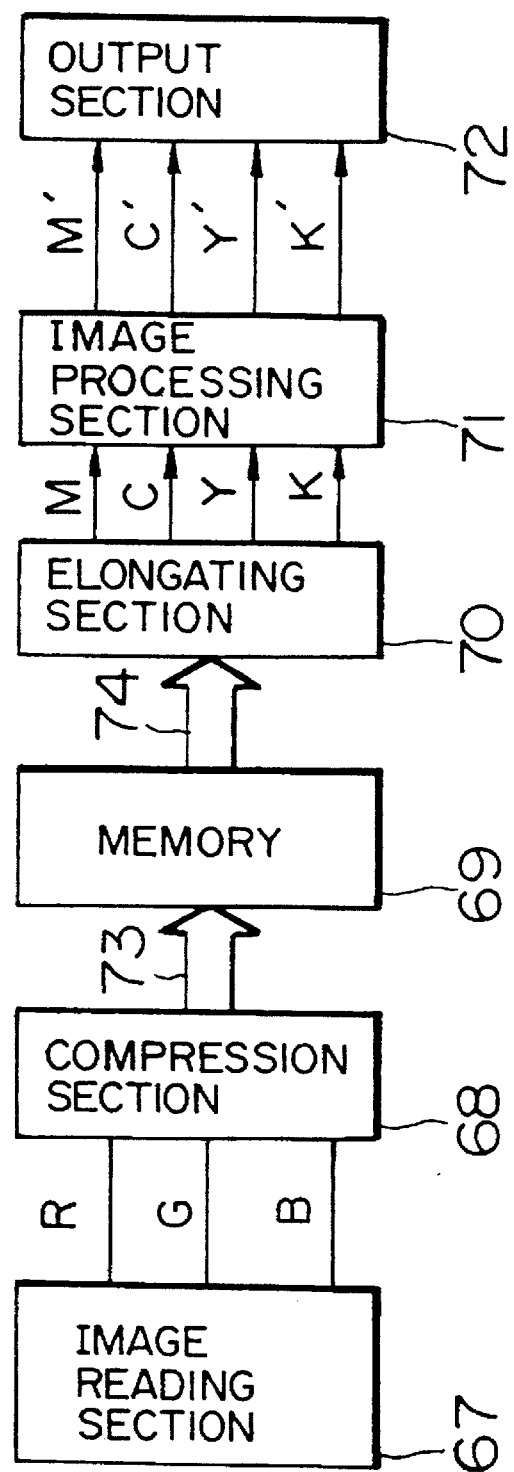
FIG. 3 is a block diagram showing the flow of signals indicating color image data.

Thus, the apparatus employs an arrangement in which a plurality of image forming units are juxtaposed with each other, and hence, might require a large capacity of memory for the completion of a full-color copy. In order to cope with this requirement, the apparatus has the following arrangement. As shown in FIG. 3, data on the image read by the image reading section is compressed, thereby reducing the amount of the image data. Thereafter, the compressed image data 73 is stored in a memory. The stored image data is read from the memory as image data 74 in synchronism with the operation of the printing section, and then output while being elongated (demodulated). For example, when a full-color A3 image having a pixel density of 400 dpi is input from the image reading section, the amount of the data which must be stored approximately corresponds to 96M bytes. However, if the data is compressed at a compression ratio of 1/20 by a DCT method or the like, the memory capacity requirement is reduced to 4.8M bytes, thereby greatly reducing the size of the circuit as well as costs.

FIG. 3 is a block diagram showing how signals flow when such compression is performed. Signals R, G and B indicating the stated color components and resulting from reading by an image reading section 67 are compressed by compression section 68, which generates a code (image data) 73. The code 73 is stored in a small-capacity memory 69. Thereafter, the code 73 is read out as a code (image data) 74 and is converted by an elongating section 70 into M, C, Y and K data for the stated color components. An image processing section 71 subjects the color component data M, C, Y and K to certain image processing which converts the data into signals M', C', Y' and K' having the form optimal for the associated output section. Then, the output section obtains a printed image.

Figure 4:
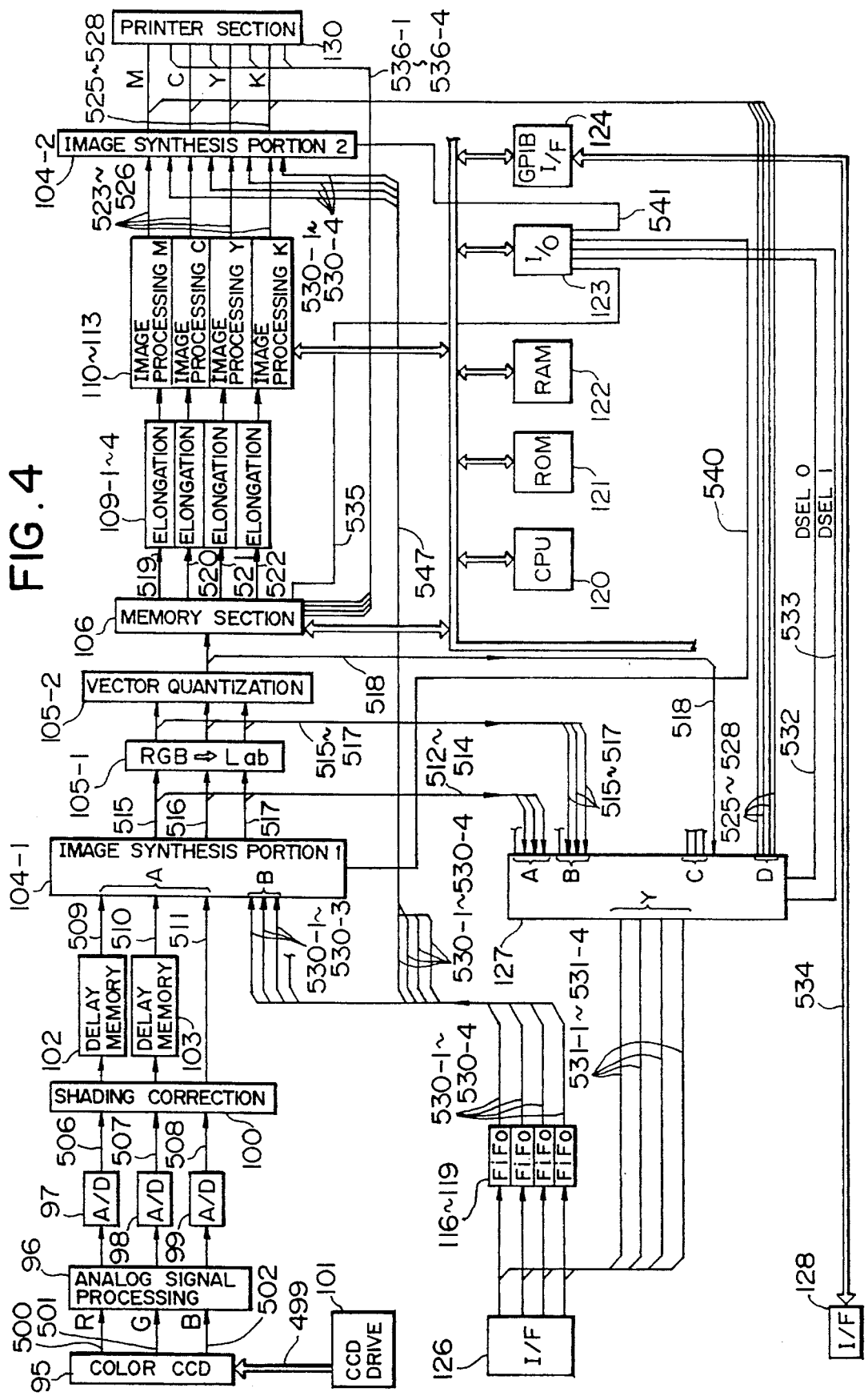
FIG. 4 is a block diagram showing processing performed in the first embodiment of the present invention.

FIG. 4 shows the entire system of a first embodiment of the present invention.

A color CCD 95, driven by a CCD driving circuit 101, reads the original, and outputs three color-separate signals R, G and B on lines 500, 501 and 502, respectively (hereinafter, reference numerals denoting signal or data lines will be used to indicate signals or data per se). The signals are subjected to black level and white level adjustment by an analog signal processing circuit 96. Thereafter, the signals for the stated colors are individually digitized by A/D converters 97, 98 and 99, thereby respectively converting the signals 500, 501 and 502 into digital signals 506, 507 and 508, each digital signal indicating a group of digital values each of which corresponds to a pixel. The digital signals, one for each of the stated colors, are subjected to shading correction (employing a generally known method) by a shading correction circuit 100. Delay memories 102 and 103 are provided to compensate for certain spatial differences of the reading positions (not shown) on the color CCD 95 as between the plurality of colors. The digital signals 506, 507 and 508 from the shading correction circuit 100 are input via the delay memories 102 and 103 to a first input terminal A of an image synthesis portion 104-1. The synthesis portion 104-1 performs synthesis of the original image obtained by receiving light reflected from the original with the CCD 95 and an input image input from external equipment, as will be described later. In this embodiment, the inputting of image data 509, 510 and 511 (for R, G and B, respectively) corresponding to the original image and the inputting of image data 530-1, 530-2 and 530-3 (for a plurality of colors) corresponding to the image input from the external equipment are switchingly performed on the basis of a select signal 540 output from an input-output (I/O) port 123 controlled by a CPU 120. The image synthesis portion 104-1 produces outputs 515, 516 and 517, and these outputs are input to an image compressing portion 501-1, in which data compression is performed.

In this embodiment, such color-image compression employs vector quantization in the (L, a*, b*) space, and involves the image compressing portion 105-1 which performs (R, G, B)→(L, a*, b*) conversion, and a vector quantizing portion 105-2. However, this is a mere example of a compression method which may be used, and other compression methods, such as an adaptive discrete cosine transform (ADCT) compression method, may be employed. (The details of the algorithm will not be described here because the present invention does not reside in this point). A signal indicates the coded data 518 resulting from the above compression. If, for example, 24-bit data for R, G and B are compressed into an 8-bit code, the ratio of this compression is ⅓.

Figure 5:
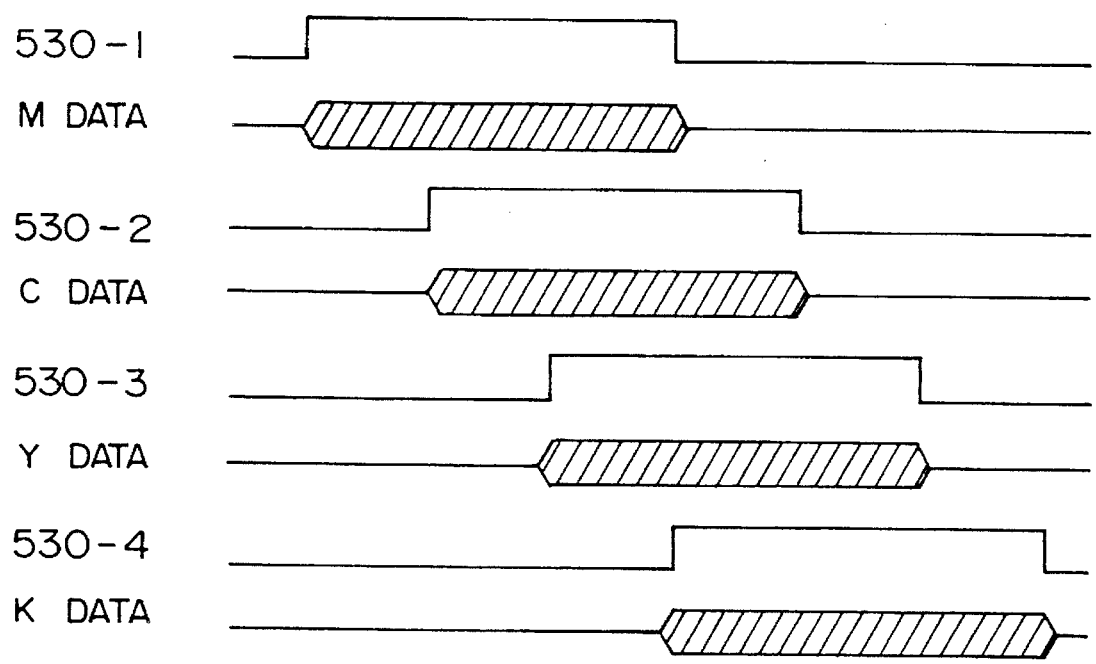
FIG. 5 is a timing chart showing the timing at which image data is read from a memory.

The coded data 518 coded by vector quantization 105-2 is temporarily stored in a memory section 106. Thereafter, items of the data 518 are read, as shown in FIG. 5, in synchronism with the timing at which the 1st to 4th image forming stations for the colors operate. Four elongation circuits 109-1 to 109-4 decode the coded color image data, and produces R, G, B-signals indicating the decoded data. The particular R, G, B-signal resulting from the decoding by the elongation circuit 109-1 is supplied as magenta (M) printing data to an image processing circuit 110. Similarly, the respective R, G, B-signals resulting from the decoding by the elongation circuits 109-2, 109-3 and 109-4 are respectively supplied, as cyan (C) printing data, yellow (Y) printing data and black (K) printing data, to the other image processing circuits 111, 112 and 113. The image processing circuits 110 (for M), 111 (C), 112 (Y) and 113 (K) generate, from the elongated R, G, B-signals, data on the colors M, C, Y and K in the manner described later. The outputs of the image processing circuits 110 to 113 indicate the respective amounts of toners which a printer section 130 should use in order to print a color image. An image synthesis portion 104-2 connected to the output of the image processing circuits 110 to 113 produces signals 525 to 528 for M, C, Y and K by, as will be described later, either synthesizing two kinds of data, i.e., the above outputs and certain color image data (in the form of M, C, Y, K) input from the external equipment, or switching the inputting of the two kinds of data. These signals 525 to 528 are supplied to the printer section 130, in which color printing is performed.

Signals 536-1 to 536-4 are synchronization signals for causing the coded color image data to be read from the image memory 106 in synchronism with the operation of the 1st to 4th stations of the image forming section. As shown in the timing chart in FIG. 5, the synchronization signals are output in parallel in a mutually shifted relationship in time.

A data selector 127 has an input terminal Y and four output terminals A, B, C and D, and is capable of transferring data on a color image to and from an external interface (I/F) 126 connected to the external equipment. While the color image data resulting from the reading of the original is being processed as described above, the form of the data changes from one to another of four different types of form, that is, the (R, G, B) 512 to 514 form, the (L, a*, b*) 515 to 517 form, the (C, M, Y, K) form and the form of data compressed in the L, a* b* space and coded 518 The image data is supplied to one of the inputs of the selector 127 while the data is in each of the four different forms.

When the external equipment requires the image data to have a particular one of the forms, the particular form is selected on the basis of a signal 532 (DSEL0) or 533 (DSEL1) output by the I/O port 123 controlled by the CPU 120 (the CPU 120 determining, on the basis of the particular form of the data which has been specified by the external equipment via a GPIB interface 124, which of the signals DSEL0 and DSEL1 should be output). The data in the selected form is output at the output terminal of the selector 127. Then, the image data is sent to the signal lines 531-1 to 531-4, and supplied via the interface 126 to the external equipment. By virtue of the above arrangement, the external equipment, such as a host computer, is able to receive, from the image processing system, color image data in the desired form. In this way, the external equipment can be released from the need to perform operations for the purpose of converting color image data. In addition, transfer of data can be performed at a high speed.

Regarding the reception of data from the external equipment, the system is capable of receiving color image data in various different forms in order to print the received data. When color image data in one of the (R, G, B) form, the (L, a*, b*) form, the form of a code compressed in the L, a*, b* space, and the (C, M, Y, K) form, is input through the interface 126, the data is stored line by line in first-in first-out (FiFo) memories 116 to 119. Thereafter, the color image data 530-1 to 530-3 is input to a second input terminal B of the image synthesis portion 104-1. The image synthesis portions 1, 2 (104-1 and 104-2) are each a selector circuit capable of switching, on the basis of a select signal 540, 541 output from the I/O port 123, between the inputting of image data resulting from the reading of the original and the inputting of image data from the external equipment which is in one of the four different types of form. The switching is performed through communication with the external equipment via the GPIB interface 124, a bus 534 and an external interface 128.

Figure 6:
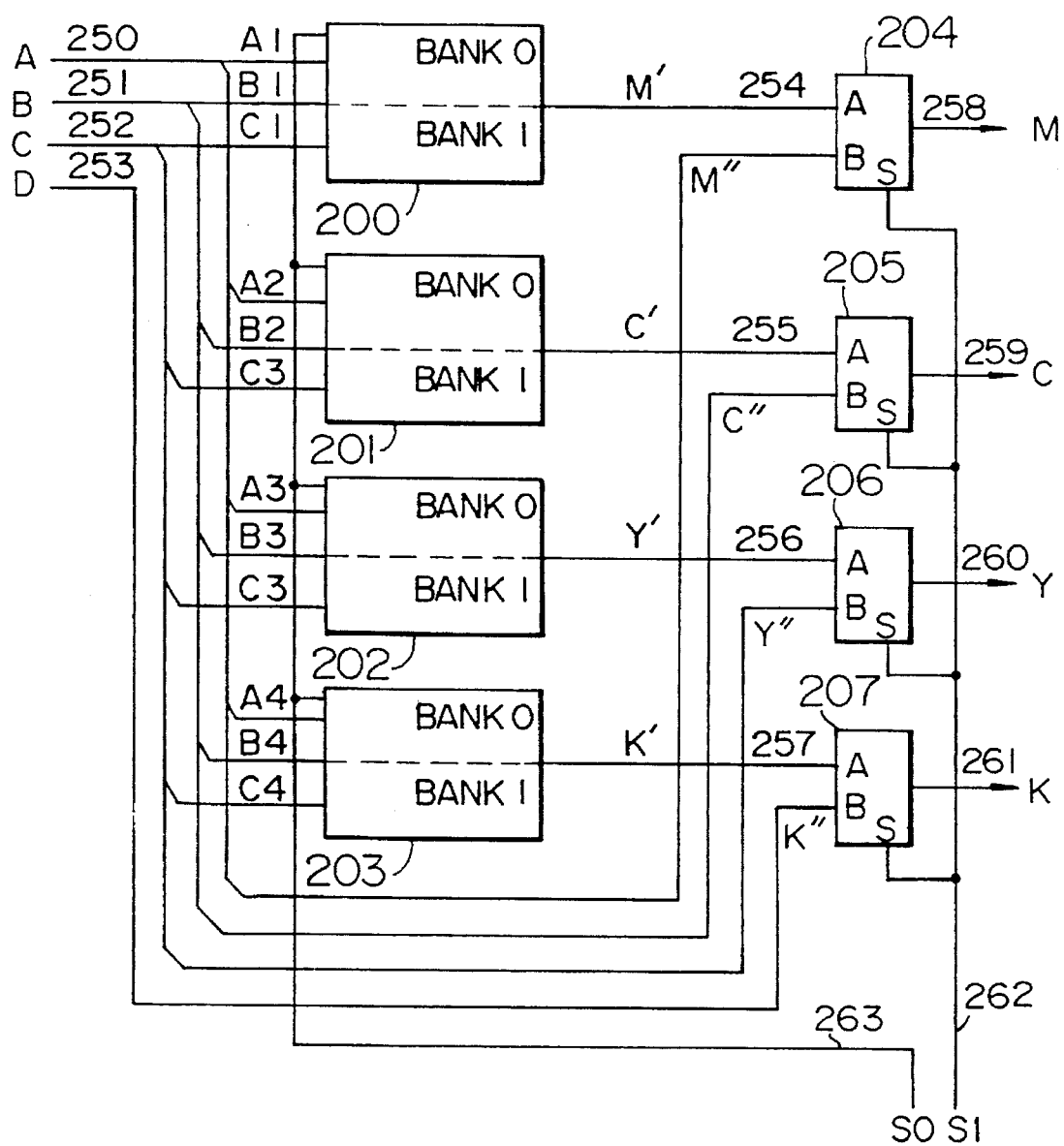
FIG. 6 is a block diagram showing the construction of a relevant portion of a second embodiment of the present invention.

FIG. 6 shows a relevant portion of a second embodiment of the present invention. This embodiment is distinguished in that conversion from various forms of color image data is performed employing look-up tables (LUTs). When four items of color image data, each item being 6-bit 64-gradation data, have been input to four input elements A, B, C and D, the items of data are stored as address information in LUTs 200, 201, 202 and 203. Each LUT consists of a ROM having first and second banks BANK0 and BANK1, which banks are used in conversion from different types of data form, as will be described below. Since each data input to the terminal elements A, B or C comprises 6-bit data, the capacity of the ROM constituting each LUT 200, 201, 202 or 203 corresponds to 256K words per bank, that is, 1024K words in total. Switching between the banks BANK0 and BANK1 is performed on the basis of a first select signal S0 (263). Signals M', C', Y' and K' (254 to 257) output from the LUTs 200 to 203 are results of the conversion of the input color data into (M, C, Y, K) data. When data input to the terminal elements A, B, C, and D are in the (M, C, Y, K) form of data, data selectors 204 to 207 (each having input terminals A and B) are switched by a second select signal S1 (262), and the data input to the terminal elements A to D are output without passing them through the LUTs. In the embodiment shown in FIG. 6, the type of signals which may be input to the terminal elements A, B, C and D are the following: (i) G, B and R signals; (ii) L*, a* and b* signals; and (iii) M, C, Y and K signals. The resultant outputs are always in the form of M, C, Y and K signals. The first banks BANK0 are LUT portions which, when G, B and R signals have been input, convert these signals into corresponding M, C, Y and K signals. The second banks BANK1 are LUT portions which, when L*, a*, b* signals have been input, convert these signals into corresponding M, C, Y and K signals.

Conversion employing the LUTs are performed in the following manner:

(i) When inputting G, B and R signals:

When G, B, and R signals have been respectively input to the terminal elements A, B and C, the signal G is supplied to the respective terminals A1 to A4 of the LUTs 200 to 203. Similarly, the signals B and R are respectively supplied to the respective terminals B1 to B4, and C1 to C4 of the LUTs 200 to 203. The LUTs 200 to 203 store reference data for performing conversion in accordance with the following principle formulae:

$M = -\log_{10} G$
$C = -\log_{10} R$
$Y = -\log_{10} B$
$K = K_0 \times \max(G, B, R)$

(11) When inputting L*, a*, b* signals:

The LUTs 200 to 203 store reference data for performing conversion in accordance with the following principle formulae:

$$\begin{pmatrix} M \\ C \\ Y \end{pmatrix} = \alpha \times \begin{pmatrix} k_1 & l_1 & m_1 \\ k_2 & l_2 & m_2 \\ k_3 & l_3 & m_3 \end{pmatrix} \begin{pmatrix} L^* \\ a^* \\ b^* \end{pmatrix}$$

$K = k_4 \times \max(M, C, Y)$ (iii) When inputting M, C, Y and K signals:

The M, C, Y, and K signals are respectively input to the terminals elements A, B, C and D, and the signals are directly input to the data selector 204 to 207 without passing the signals through the LUT 200 to 203. The first select signal S1 (262) is applied to the data selectors 204 to 207 so that input to each input terminal B will be selected. The inputs to the selectors 204 to 207 are output at lines 258 to 261.

The construction shown in FIG. 6 is provided, for example, between the FiFo 116 to 119 and the image synthesis portion 104-1 shown in FIG. 4.

Although in the foregoing second embodiment, the input color image data is in one of (R, G, B) image data form, (Y, M, C, K) image data form, and (L, a, b) image data form, the input data may be in another type of data form. For example, image data in the form of (Y, I, Q) or (L, U, V) may be input.

A method of compression which may be used in the foregoing embodiment is not limited to a vector quantization method, described above. For example, an ADCT compression method may be used.

As described above, according to the foregoing embodiments, it is possible to process color image signals of various types without the need to employ large and expensive hardware.

A third embodiment of the present invention will be described with reference to FIG. 7.

In this embodiment, it is possible to process compressed data which has been input from outside even when the input data has been compressed by a method different from the method (e.g., a vector quantization method) employed by the system (a system such as that shown in FIG. 4). Those arrangements of the third embodiment which are the same as those of the embodiment shown in FIG. 4 will not be described to avoid redundancy.

In the third embodiment, it is possible to input and output image data through the I/F 126 without passing the data through the FiFo memories 116 to 119.

In the embodiment shown in FIG. 4, the image data which has been input through the I/F 126 is input to the image synthesis portions 104-1 and 104-2, whereby input image data is synthesized with the image data supplied from the color CCD 95. In contrast, in the embodiment shown in FIG. 7, the image data which has been input through the I/F 126 is input to various parts of the image processor without passing through the image synthesis portions 104-1 and 104-2.

For example, when R, G, B-data has been input through the I/F 126, the selector 327 outputs the data at an output terminal A thereof. When L, a, b-data has been input through the I/F 126, the selector 327 outputs the data at its output terminal B. When data subjected to vector quantization has been input through the I/F 126, the selector 327 outputs the data at its output terminal C. When M, C, Y, K-data has been input through the I/F 126, the selector 327 outputs the data at its output terminal D. When data subjected to ADCT compression has been input through the I/F 126, the selector 327 outputs the data at its output terminal E.

In this embodiment, further FiFO memories 302 to 306 are provided in order to compensate for the possible difference between the speed at which data is input from outside and the speed at which data is transferred between various parts within the system.

Further, an ADCT elongation circuit 300 is provided in order that, when image data subjected to ADCT compression in the L, a, b space has been input from outside, the ADCT-compressed image data may be elongated and input to the vector quantization circuit 105-2.

Figure 7:
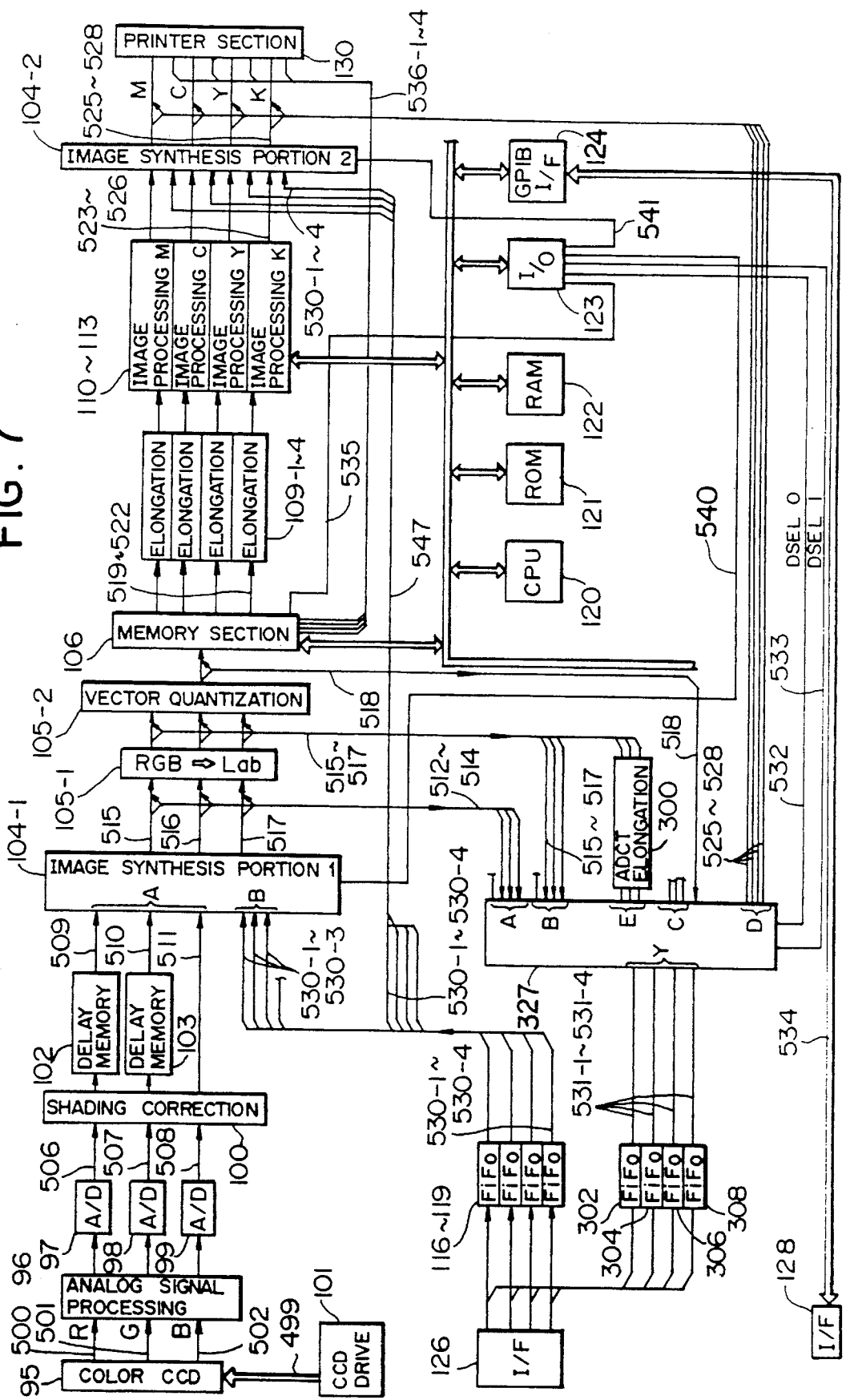
FIG. 7 is a block diagram showing the construction of a third embodiment of the present invention.

In the embodiment shown in FIG. 7, the I/F 128 inputs a determination signal indicating the type of the image data input from outside, and the CPU 120 determines the type of the data on the basis of the determination signal. In accordance with the thus-determined type of the data, the state of the selector 327 is switched.

When inputting image data in the above-described manner, the FiFo memories 302 to 308 operate to suitably convert the speed of inputting the image data.

The other operation of the third embodiment is the same as that of the embodiment shown in FIG. 1, and the description of the operation will be omitted.

A fourth embodiment of the present invention will be described with reference to FIG. 8.

In the third embodiment shown in FIG. 7, in order to input ADCT-compressed image data from outside, the system includes the ADCT elongation circuit 300 for performing ADCT elongation of the image data before the data is stored in the memory section 106. In contrast, the fourth embodiment is distinguished in that ADCT elongation circuits 309-1 to 309-4 are connected to the output side of the memory section 106. Thus, the four ADCT elongation circuits 309-1 to 309-4 are provided so that it is possible to obtain four M, C, Y and K color components at a certain timing (such as that shown in FIG. 5) as in the first embodiment shown in FIG. 4.

When the fourth embodiment is compared with the embodiment shown in FIG. 7, the fourth embodiment is advantageous in that it is capable of improving image quality when inputting image data subjected to ADCT compression. In the embodiment shown in FIG. 7, the ADCT-compressed image data input from outside is elongated, and again subjected to vector quantization, thereby involving the risk of deteriorating the image quality due to the fact that compression/elongation process is effected a plurality of times. In contrast, in the embodiment shown in FIG. 8, the ADCT-compressed data is elongated only one time, thereby preventing such deterioration.

Another advantage of the fourth embodiment is that, since the ADCT-compressed image data is stored in the memory section 106, it is possible to output the ADCT-compressed image data from the memory section 106 through the I/O 123 to the outside of the system.

A compression method which may be used in this embodiment is not limited to a vector quantization method or an ADCT method, and may be other compression method.

Although in the foregoing embodiments, the interface though which image data is input or output and the interface through which a control signal, etc. are input or output comprise different circuits, these interfaces may comprise a common circuit.

Figure 8:
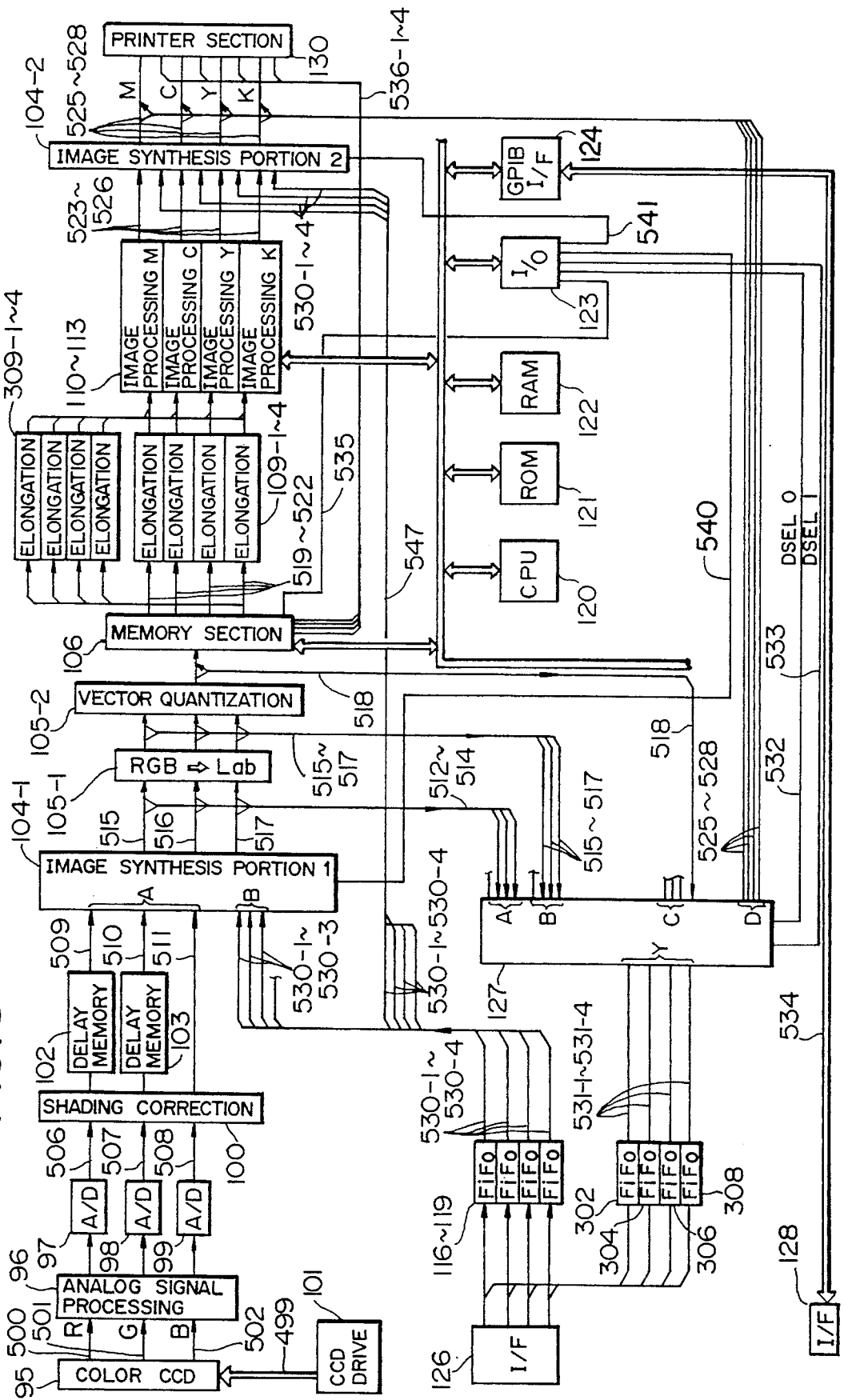
FIG. 8 is a block diagram showing the construction of a forth embodiment of the present invention.

In the embodiments shown in FIG. 7 and 8, when inputting data from outside, the FiFo memories 302 to 308 are used to change the speed at which the image data is input. When outputting image data to outside, however, the FiFo memories 302 to 308 are rendered substantially inoperative.

With the above-described embodiments, it is possible to appropriately process compressed image data.

Although the present invention has been described in connection with certain preferred embodiments, it will be apparent to those of ordinary skill in the art that many changes may be made without departing from the scope of the present invention as defined in the appended claims.

What is claimed is:

1. An image processing system comprising:

first input means for inputting first image data;

second input means different from said first input means for inputting second image data of a plurality of types into said image processing system from external equipment; and a plurality of color processing sections for sequentially processing the first image data inputted by said first input means, wherein when the second image data input by said second input means is of a predetermined type, at least one, but not all, of said plurality of color processing sections processes the second image data and all remaining color processing sections perform no processing of the second image data.

2. A system according to claim 1, wherein each type of image data indicates a color space of the second image data.

3. A system according to claim 2, wherein the types include a RGB color space.

4. A system according to claim 2, wherein the types include a YMCK color space.

5. A system according to claim 2, wherein the types include a La*b* color space.

6. A system according to claim 1, further comprising generating means for generating discrimination data indicating the type of the second image data.

7. A system according to claim 6, wherein said discrimination data is generated by communication with the external equipment.

8. A system according to claim 1, wherein said first input means is an image reader.

9. A system according to claim 1, wherein said plurality of color processing sections include a processing section that performs color-space conversion.

10. A system according to claim 1, wherein said plurality of color processing section includes a printing processing section.

11. A system according to claim 1, wherein said predetermined type is a YMCK color space.

12. An image processing system comprising:

first input means for inputting image data;

second input means different from said first input means for inputting image data of a plurality of types into said image processing system from external equipment; and a plurality of color processing sections for sequentially processing the image data inputted by said first input means, wherein each of at least some of said color processing sections except a final one outputs processed image data to a respective subsequent one of said color processing sections, and wherein said second input means inputs its image data to a respective different one of said color processing sections in accordance with the type of the image data input by said second input means.

13. A system according to claim 12, wherein the image data inputted by said first input means is data of an RGB space.

14. A system according to claim 12, wherein said first input means comprises photoelectric conversion means for converting light into image data photoelectrically.

15. A system according to claim 12, further comprising:

reproducing means for reproducing processed image data from said final one of said color processing sections to provide a visual image.

16. A system according to claim 15, wherein said reproducing means comprises a color printer.

17. A system according to claim 16, wherein said color printer employs an electrophotographic process.

18. A system according to claim 17, wherein said color printer employs an ink-jet process.

19. A system according to claim 16, wherein said color printer employs an ink-jet process.

20. A system according to claim 12, wherein the type of image data input by said second input means is a type of color space of the image data.

21. A system according to claim 12, wherein the type of image data input by said second input means is a type of compression used to compress the image data.

22. An image processing system comprising:

first input means for inputting image data;

second input means different from said first input means for inputting a plurality of image data into said system from external equipment;

identity data input means for inputting identity data relating to the image data inputted by said second input means;

a first color processing section for processing said image data inputted by said first input means or by said second input means and outputting processed image data;

a second color processing section, which performs different processing from that of said first processing section, for processing image data inputted by said second input means or the processed image data outputted by said first color processing section; and control means for controlling inputting of said plurality of image data to said first processing section or to said second processing section in accordance with said identity data.

23. A system according to claim 22, wherein said first color section comprises means for converting R,G,B data into L*,a*,b* data.

24. A system according to claim 22, wherein said second color processing section comprises means for converting L,a,b data into Y,M,C,K data.

* * * * *

UNITED STATES PATENT AND TRADEMARK OFFICE
CERTIFICATE OF CORRECTION

PATENT NO. : 5,568,285

DATED : October 22, 1996

INVENTOR(S) : IKEDA

It is certified that error appears in the above-identified patent and that said Letters Patent is hereby corrected as shown below:

```
On the title page, item:

[56], REFERENCES CITED, U.S. PATENT DOCUMENTS

Insert --4,745,467  5/1988  Sekizawa et al.
         4,758,885  7/1988  Sasaki et al.
         4,877,151 12/1989  Wataya--

COLUMN 5

Line 54, "produces" should read --produce--.
```

Signed and Sealed this

Twenty-second Day of April, 1997

Attest:

BRUCE LEHMAN

*Commissioner of Patents and Trademarks*

*Attesting Officer*